US012240977B2

(12) United States Patent
Yoshimura et al.

(10) Patent No.: US 12,240,977 B2
(45) Date of Patent: *Mar. 4, 2025

(54) POLYAMIDE RESIN COMPOSITION AND METHOD OF PRODUCING SAME

(71) Applicant: TOYOBO MC Corporation, Osaka (JP)

(72) Inventors: Nobuhiro Yoshimura, Otsu (JP); Ryo Umeki, Otsu (JP)

(73) Assignee: TOYOBO MC CORPORATION, Osaka (JP)

(*) Notice: Subject to any disclaimer, the term of this patent is extended or adjusted under 35 U.S.C. 154(b) by 330 days.

This patent is subject to a terminal disclaimer.

(21) Appl. No.: 17/297,110

(22) PCT Filed: Nov. 25, 2019

(86) PCT No.: PCT/JP2019/045924
§ 371 (c)(1),
(2) Date: May 26, 2021

(87) PCT Pub. No.: WO2020/110978
PCT Pub. Date: Jun. 4, 2020

(65) Prior Publication Data
US 2022/0289972 A1 Sep. 15, 2022

(30) Foreign Application Priority Data
Nov. 28, 2018 (JP) ................... 2018-222127

(51) Int. Cl.
C08L 77/02 (2006.01)
(52) U.S. Cl.
CPC .................... C08L 77/02 (2013.01)
(58) Field of Classification Search
CPC .............. C08L 77/06; C08L 2205/02; C08L 2205/025; C08L 2310/00; C08L 2666/54; C08L 2666/55; C08L 2666/62; C08L 2666/72; C08L 77/02; C08K 3/04; C08K 3/08; C08K 3/0812; C08K 3/40; C08K 3/105; C08K 3/34; C08K 3/20; C08K 3/22; C08K 3/2003; C08K 3/2205; C08K 3/2217; C08K 3/2227; C08K 3/2237; C08K 3/2241; C08K 3/346; C08K 7/14; C08K 2003/023
See application file for complete search history.

(56) References Cited

U.S. PATENT DOCUMENTS

| | | |
|---|---|---|
| 5,371,132 A | 12/1994 | Ebara et al. |
| 5,412,013 A | 5/1995 | Watanabe et al. |
| 6,534,583 B1 | 3/2003 | Tamura et al. |
| 2003/0125440 A1 | 7/2003 | Tamura et al. |
| 2003/0125481 A1 | 7/2003 | Tamura et al. |
| 2011/0263777 A1 | 10/2011 | Nakagawa |
| 2017/0267861 A1 | 9/2017 | I et al. |
| 2018/0371185 A1 | 12/2018 | Tanaka et al. |
| 2021/0101347 A1* | 4/2021 | Nishino ............ C08K 3/346 |
| 2022/0081563 A1 | 3/2022 | Yoshimura et al. |
| 2023/0104768 A1 | 4/2023 | Yoshimura et al. |

FOREIGN PATENT DOCUMENTS

| | | |
|---|---|---|
| CN | 108291086 | 7/2018 |
| EP | 0 337 443 | 10/1989 |
| EP | 3 889 213 | 10/2021 |
| JP | 1-263151 | 10/1989 |
| JP | 2-140265 | 5/1990 |
| JP | 3-9952 | 1/1991 |
| JP | 3-269056 | 11/1991 |
| JP | 4-202358 | 7/1992 |
| JP | 6-145345 | 5/1994 |
| JP | 2000-154316 | 6/2000 |
| JP | 2002-69295 | 3/2002 |
| JP | 2002-97363 | 4/2002 |
| JP | 2004-315606 | 11/2004 |
| JP | 2005-239800 | 9/2005 |
| JP | 2010-13571 | 1/2010 |

(Continued)

OTHER PUBLICATIONS

JP 2000154316 machine translaton (Jun. 2000).*
Extended European Search Report issued Jul. 7, 2022 in corresponding European Patent Application No. 19889910.6.
Office Action issued Jun. 29, 2022 in corresponding Chinese Patent Application No. 201980076314.0, with English language translation.
International Search Report (ISR) issued Feb. 10, 2020 in International (PCT) Application No. PCT/JP2019/045924.
Office Action issued Dec. 2, 2022 in Taiwanese Patent Application No. 108142870, with English-language translation.
International Search Report issued Mar. 30, 2021 in International (PCT) Application No. PCT/JP2021/001652.

(Continued)

Primary Examiner — Ana L. Woodward
(74) Attorney, Agent, or Firm — Wenderoth, Lind & Ponack, L.L.P.

(57) ABSTRACT

A polyamide resin composition includes: (A) a crystalline polyamide resin including a polycapramide resin as a main component; (B) a semi-aromatic amorphous polyamide resin; (C) an inorganic reinforcing material, (D) a carbon black masterbatch; and (E) a copper compound, wherein as (C) the inorganic reinforcing material, the polyamide resin composition includes (C-1) a glass fiber, (C-2) a needle-shaped wollastonite, and (C-3) a plate-crystal inorganic reinforcing material, a melt mass flow rate (MFR) and a cooling crystallization temperature (TC2) of the polyamide resin composition fall within predetermined respective ranges, mass ratios and contents of the component satisfy specific conditions. By the polyamide resin composition, not only a molded product having a higher level of external appearance is obtained when a mold temperature is less than or equal to 100° C. during molding, but also an excellent weather resistance of the external appearance of the surface of the molded product is attained.

2 Claims, No Drawings

(56) References Cited

FOREIGN PATENT DOCUMENTS

| JP | 2011-057977 | 3/2011 |
| WO | 2010/087192 | 8/2010 |
| WO | 2017/094696 | 6/2017 |

OTHER PUBLICATIONS

International Preliminary Report on Patentability issued Jul. 26, 2022 in International (PCT) Application No. PCT/JP2021/001652.
International Search Report (ISR) issued Apr. 14, 2020 in International (PCT) Application No. PCT/JP2020/001857.
Extended European Search Report issued Sep. 23, 2022 in European Patent Application No. 20749218.2.
Office Action issued Apr. 20, 2023 in Chinese Patent Application No. 202180009814.X, with English translation.
Office Action issued Oct. 19, 2023 in Chinese Patent Application No. 202180009814.X with English translation.
Office Action issued Feb. 28, 2024 in the Korean Patent Application No. 10-2022-7025283, with English translation.
Notice of Allowance issued Mar. 7, 2024 in U.S. Appl. No. 17/421,203.
Extended European Search Report issued Jan. 18, 2024, in European Patent Application No. 21744526.1.
Office Action issued Jan. 31, 2024, in Taiwanese Patent Application No. 110102036, with English translation.
Office Action issued Sep. 24, 2024 in Indian Patent Application No. 202247046998.

* cited by examiner

POLYAMIDE RESIN COMPOSITION AND METHOD OF PRODUCING SAME

TECHNICAL FIELD

The present invention relates to a polyamide resin composition including, as main components, a polycapramide (polycaproamide) resin, a semi-aromatic amorphous polyamide resin, an inorganic reinforcing material, a carbon black, and a copper compound. Specifically, the polyamide resin composition of the present invention relates to a polyamide resin composition that has excellent rigidity and strength, that allows for an excellent external appearance of a molded product (mirror surface luster and/or uniformity in textured surface), and that has an excellent weather resistance. In particular, the polyamide resin composition of the present invention is suitable for exterior parts for vehicles and door mirror parts.

BACKGROUND ART

Polyamide resins are generally excellent in mechanical properties, heat resistance, impact resistance, and chemical resistance, and have been widely used in vehicle parts, electric parts, electronic parts, household sundries, and the like. Among them, a polyamide resin having an inorganic reinforcing material such as a glass fiber added therein attains significantly improved rigidity, strength, and heat resistance. Particularly, it has been known that the rigidity is improved in proportion to an amount of addition of the inorganic reinforcing material.

However, when a large amount of, for example, 50 to 70 mass % of the reinforcing material such as glass fiber is added to the polyamide resin in order to improve the rigidity and the strength, the external appearance of a molded product (such as mirror surface luster and uniformity in textured surface) is extremely deteriorated, with the result that the commercial value thereof is significantly compromised. To address this, as a method of improving the external appearance of the molded product, it has been proposed to add an amorphous resin to a crystalline polyamide resin (PTL 1 to PTL 4). However, these methods do not provide excellent mirror surface luster and uniformity in textured surface luster. Meanwhile, there has been known a method for increasing strength and rigidity by providing large amounts of nylon 66, glass fiber, and mica in a semi-aromatic polyamide resin (MXD-6) (for example, PTL 5). In this case, however, it is necessary to increase a mold temperature to a high temperature of 135° C. during molding. Moreover, even when the temperature is increased to such a high temperature, the molded product may fail to attain an excellent external appearance.

To address this, there has been proposed a polyamide resin composition by which the external appearance of a molded product is not deteriorated even when a large amount of, for example, more than or equal to 50 mass % of an inorganic reinforcing material such as glass fiber is added (PTL 6). According to the resin composition disclosed in PTL 6, even when the mold temperature is less than or equal to 100° C. during molding, the molded product generally attains an excellent external appearance. However, it has been found that there is room for improvement in the following points: (1) a demand for a higher level of external appearance needs to be satisfied; (2) a poor external appearance may be resulted in some cases; and (3) in long-term use of the molded product, a problem arises in terms of a weather resistance of the external appearance of the surface of the molded product, such as discoloration, emergence or exposure of the reinforcing material on the surface of the molded product, and the texture of the molded product being indistinct.

CITATION LIST

Patent Literature

PTL 1: Japanese Patent Laying-Open No. 2-140265
PTL 2: Japanese Patent Laying-Open No. 3-9952
PTL 3: Japanese Patent Laying-Open No. 3-269056
PTL 4: Japanese Patent Laying-Open No. 4-202358
PTL 5: Japanese Patent Laying-Open No. 1-263151
PTL 6: Japanese Patent Laying-Open No. 2000-154316

SUMMARY OF INVENTION

Technical Problem

In view of the above, it is an object of the present invention to provide a polyamide resin composition by which not only a molded product having a higher level of external appearance is obtained even when a mold temperature is less than or equal to 100° C. during molding but also an excellent weather resistance of the external appearance of the surface of the molded product is attained.

Solution to Problem

As a result of diligent study to achieve the above-described object, the present inventors have fully reviewed the composition of the polyamide resin composition described in PTL 6. Further, by blending specific amounts of a carbon black and a copper compound, the present inventors have found out a polyamide resin composition by which a molded product can be obtained to have a higher level of external appearance and an excellent weather resistance in the external appearance of the surface thereof. In this way, the present invention has been completed.

That is, the present invention is as follows.

[1] A polyamide resin composition includes: (A) a crystalline polyamide resin including a polycapramide resin as a main component; (B) a semi-aromatic amorphous polyamide resin; (C) an inorganic reinforcing material, (D) a carbon black masterbatch; and (E) a copper compound, wherein as (C) the inorganic reinforcing material, the polyamide resin composition includes (C-1) a glass fiber, (C-2) a needle-shaped wollastonite, and (C-3) a plate-crystal inorganic reinforcing material, a melt mass flow rate (MFR) of the polyamide resin composition with a moisture content of less than or equal to 0.05% is more than or equal to 4.0 g/10 min and less than 13.0 g/10 min, a cooling crystallization temperature (TC2) of the polyamide resin composition as measured by a differential scanning calorimeter (DSC) is more than or equal to 180° C. and less than or equal to 185° C., a mass ratio of (A) and (B) satisfies $0.5 < (B)/(A) \leq 0.8$, and when a total of (A), (B), (C) and (D) is assumed as 100 parts by mass, a content of (E) is 0.001 to 0.1 part by mass, and contents of the components satisfy the following formulas:

30 parts by mass $\leq (A)+(B)+(D) \leq$ 60 parts by mass, 13 parts by mass $\leq (B) \leq$ 23 parts by mass, 1 part by mass≤(D)≤5 parts by mass, 20 parts by mass≤(C-1)≤40 parts by mass, 8 parts by mass≤(C-2)≤25 parts by mass, 8 parts by mass≤(C-3)≤25 parts by mass, and 40 parts by mass≤(C-1)+(C-2)+(C-3)≤70 parts by mass.

[2] A method of producing the polyamide resin composition recited in [1], wherein (A) the crystalline polyamide resin including the polycapramide resin as the main component, (B) the semi-aromatic amorphous polyamide resin, (D) the carbon black masterbatch, and a dispersion of (E) the copper compound are mixed in advance and are introduced into a hopper portion of an extruder, and (C) the inorganic reinforcing material is introduced in accordance with a side feed method.

Advantageous Effects of Invention

By the polyamide resin composition of the present invention, not only a molded product having a higher level of excellent external appearance is obtained when a mold temperature is less than or equal to 100° C. during molding, but also an excellent weather resistance is attained in the external appearance, such as a texture, of the surface of the obtained molded product.

DESCRIPTION OF EMBODIMENTS

Hereinafter, the present invention will be specifically described. First, each of components used in the present invention will be described.

In the present invention, regarding whether a polyamide resin is crystalline or amorphous, a polyamide resin exhibiting a distinct melting point peak is deemed as being crystalline and a polyamide resin exhibiting no distinct melting point peak is deemed as being amorphous in measurement with a DSC at a temperature increase rate of 20° C./min in accordance with JIS K 7121:2012.

Unless otherwise specified, the content (blended amount) of each of the components in the polyamide resin composition of the present invention is expressed as an amount when the total of (A) a crystalline polyamide resin including a polycapramide resin as a main component, (B) a semi-aromatic amorphous polyamide resin, (C) an inorganic reinforcing material, and (D) a carbon black masterbatch is assumed as 100 parts by mass.

The component (A) in the present invention is a crystalline polyamide resin including a polycapramide resin as a main component. The polycapramide resin is normally referred to as nylon 6, and is obtained by polymerization of ε-caprolactam. The relative viscosity (96% sulfuric acid method) of the polycapramide resin in the present invention is preferably in a range of 1.7 to 2.2. The relative viscosity thereof is particularly preferably in a range of 1.9 to 2.1. It should be noted that when the relative viscosity falls within this range, the resin attains satisfactory toughness and flowability (the flowability leads to an intended external appearance of the molded product). However, it is realistic to regulate a melt mass flow rate of the polyamide resin composition, rather than regulating the relative viscosity of the polycapramide resin.

The content of the polycapramide resin in the component (A) is preferably more than or equal to 70 mass %, is more preferably more than or equal to 80 mass %, and is further preferably more than or equal to 90 mass %. The content of the polycapramide resin may be 100 mass %. A crystalline polyamide resin that may be included as the component (A) except for the polycapramide resin is not particularly limited. Examples thereof include polytetramethylene adipamide (polyamide 46), polyhexamethylene adipamide (polyamide 66), polyundecamethylene adipamide (polyamide 116), polymethaxylylene adipamide (polyamide MXD6), polyparaxylylene adipamide (polyamide PXD6), and polytetramethylene sebacamide (polyamide 410), polyhexamethylene sebacamide (polyamide 610), polydecamethylene adipamide (polyamide 106), polydecamethylene sebacamide (polyamide 1010), polyhexamethylene dodecamide (dodecanamide) (polyamide 612), polydecamethylene dodecamide (dodecanamide) (polyamide 1012), polyhexamethylene isophthalamide (polyamide 61), polytetramethylene terephthalamide (polyamide 4T), polypentamethylene terephthalamide (polyamide 5T), and poly-2-methylpentamethylene terephthalamide (polyamide M-5T), polyhexamethylene terephthalamide (polyamide 6T), polyhexamethylene hexahydro terephthalamide (polyamide 6T (H)), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polylauryllactam (polyamide 12), poly-11-aminoundecanoic acid (polyamide 11), and copolymers of component units thereof.

The component (B) in the present invention is a semi-aromatic amorphous polyamide resin in which an aromatic component is included in a diamine component or a dicarboxylic acid component. Examples of the dicarboxylic acid include terephthalic acid, isophthalic acid, adipic acid, sebacic acid, and the like. Examples of the diamine include tetramethylenediamine, hexamethylenediamine, metaxylylenediamine, paraxylylenediamine, undecamethylenediamine, dodecamethylenediamine, 2-methylpentamethylenediamine, trimethylhexamethylenediamine, aminoethylpiperazine, bisaminomethylcyclohexane, and the like. Among these, polyamide 6T/6I using terephthalic acid, isophthalic acid, and adipic acid as raw materials is preferable.

The relative viscosity (96% sulfuric acid method) of the semi-aromatic amorphous polyamide resin is not particularly limited, but is preferably in a range of 1.8 to 2.4.

The total content of the component (A), the component (B) and the carbon black masterbatch (D) described below is 30 to 60 parts by mass, and is preferably 35 to 55 parts by mass. The content of the component (B) is 13 to 23 parts by mass, and is preferably 13 to 22 parts by mass. When the content of the component (B) is less than 13 parts by mass, a molded product does not attain a higher level of excellent external appearance. On the other hand, when the content of the component (B) is more than 23 parts by mass, crystal solidification of the molded product becomes poor, thus resulting in occurrence of a mold release failure or decreased heat rigidity during molding. The content of the component (A) is not particularly limited as long as it is determined in consideration of the contents of the component (B) and the component (D), but is preferably 20 to 34 parts by mass and is more preferably 21 to 32 parts by mass.

In the present invention, the mass ratio of the component (A) and the component (B) needs to satisfy the following formula:

$$0.5 < (B)/(A) \leq 0.8$$

In the present invention, when (B)/(A) falls within this range, a molded product having a higher level of excellent external appearance can be obtained. (B)/(A) is preferably more than or equal to 0.52 and less than or equal to 0.75, and is more preferably more than or equal to 0.55 and less than or equal to 0.75.

The component (C) in the present invention is an inorganic reinforcing material, and includes: (C-1) a glass fiber, (C-2) a needle-shaped wollastonite, and (C-3) a plate-crystal inorganic reinforcing material. Examples of (C-3) the plate-crystal inorganic reinforcing material include mica, talc, and non-calcined clay, and the like. Among them, mica and talc are preferable and mica is more preferable. As the component (C), the following component(s) may be included as long as the effect of the present invention is not compromised: a fibrous inorganic reinforcing material such as a whisker, a carbon fiber, or a ceramic fiber; and/or a powdery inorganic reinforcing material such as silica, alumina, kaolin, quartz, powdered glass (milled fiber), or graphite. Each of these inorganic reinforcing materials usable herein may be subjected to a surface treatment such as an amino silane treatment.

As (C-1) the glass fiber, a general glass fiber having an average cross sectional diameter of about 4 to 20 μm and having a cut length of about 3 to 6 mm can be used. The average fiber length of the glass fiber in the molded product becomes short in a processing step (compounding step/molding step) to be about 150 to 300 μm. The content of (C-1) the glass fiber is 20 to 40 parts by mass, and is preferably 25 to 35 parts by mass. When the content of (C-1) the glass fiber is less than 20 parts by mass, low strength and rigidity are resulted. On the other hand, when the content of (C-1) the glass fiber is more than 40 parts by mass, it is difficult to obtain an excellent external appearance of the molded product, unfavorably.

(C-2) The needle-shaped wollastonite is a wollastonite having an average cross sectional diameter of about 3 to 40 μm and having an average fiber length of about 20 to 180 μm. The content of (C-2) the needle-shaped wollastonite is 8 to 25 parts by mass, is preferably 10 to 25 parts by mass, and is more preferably 13 to 20 parts by mass. When the amount is less than 8 parts by mass, low strength and rigidity are resulted. On the other hand, when the content of (C-2) the needle-shaped wollastonite is more than 25 parts by mass, it is difficult to obtain an excellent external appearance of the molded product, unfavorably.

Examples of (C-3) the plate-crystal inorganic reinforcing material include talc, mica, non-calcined clay, and the like. The shape of the plate-crystal inorganic reinforcing material is in the form of fish scale. The content of (C-3) the plate-crystal inorganic reinforcing material is 8 to 25 parts by mass, is preferably 10 to 25 parts by mass, and is more preferably 13 to 20 parts by mass. When the content of (C-3) the plate-crystal inorganic reinforcing material is less than 8 parts by mass, low strength and rigidity are resulted. On the other hand, when the content of (C-3) the plate-crystal inorganic reinforcing material is more than 25 parts by mass, it is difficult to obtain an excellent external appearance of the molded product, unfavorably. It should be noted that among (C-3) the plate-crystal inorganic reinforcing materials, mica is particularly excellent in terms of strength and rigidity.

The content of the component (C), i.e., the inorganic reinforcing material is 40 to 70 parts by mass, is preferably 45 to 70 parts by mass, and is more preferably 55 to 65 parts by mass. When the content of the component (C) is less than 40 parts by mass, low strength and rigidity are resulted. On the other hand, when the content of the component (C) is more than 70 parts by mass, an excellent external appearance of the molded product cannot be obtained and low strength is resulted. When 20 to 40 parts by mass of the component (C-1), 8 to 25 parts by mass of the component (C-2), and 8 to 25 parts by mass of the component (C-3) are contained as the component (C), excellent strength and rigidity as well as excellent external appearance of the surface of the molded product (mirror surface luster and/or uniformity in textured surface) are attained.

Each of the components of the component (C) exhibits a reinforcing effect in the polyamide resin composition. Among them, (C-1) the glass fiber exhibits the highest reinforcing effect, but leads to large warpage deformation of the molded product. Although each of (C-2) the needle-shaped wollastonite and (C-3) the plate-crystal inorganic reinforcing material does not have a reinforcing effect as large as that of the glass fiber, warpage deformation is small due to its aspect ratio being smaller than that of the glass fiber, advantageously. Further, the needle-shaped wollastonite can also contribute to prevention of sinking after molding. By appropriately combining these, it is possible to produce a resin composition that does not cause large deformation after molding even though a high concentration of reinforcing material is blended.

Normally, a reinforced polyamide resin composition having high concentrations of glass fiber, wollastonite, and the like blended therein is inferior in weather resistance to result in exposure of the reinforcing material. However, by combining the carbon black masterbatch and the copper compound described below, the weather resistance can be controlled to prevent exposure of the reinforcing material.

An exemplary component (D) in the present invention is a carbon black masterbatch. The carbon black masterbatch preferably employs an LD-PE (low-density polyethylene) or AS resin (acrylonitrile-styrene copolymer) as a base resin and has 30 to 60 mass % of carbon black contained therein. The LD-PE or AS resin is compatible with the polyamide resin. By using such a masterbatch, the following effects are exhibited: dispersibility of carbon black is excellent and excellent working environment is attained; emergence and exposure of the glass fiber or other inorganic reinforcing material(s) are highly suppressed; and durability is improved in the external appearance of the molded product. The content of the carbon black masterbatch is 1 to 5 parts by mass, and is preferably 2 to 4 parts by mass. The content of the carbon black is preferably in a range of 0.5 to 3.0 parts by mass, and is more preferably 1 to 2 parts by mass. When the content of the carbon black is more than 3.0 parts by mass, a mechanical property may be deteriorated.

An exemplary component (E) in the present invention is a copper compound and is not particularly limited as long as it is a compound containing copper. Examples thereof include copper halide (copper iodide, copper(I) bromide, copper(II) bromide, copper(I) chloride, or the like), copper acetate, copper propionate, copper benzoate, copper adipate, copper terephthalate, copper isophthalate, copper salicylate, copper nicotinate, and copper stearate, as well as a copper complex salt in which a chelating agent such as ethylenediamine or ethylenediaminetetraacetic acid is coordinated to copper. One of them may be used solely or two or more of them may be used in combination.

Among the copper compounds listed above, it is preferable to use copper halide. It is more preferable to use one or more selected from a group consisting of copper iodide, copper(I) bromide, copper(II) bromide, and copper(I) chloride. It is further preferable to use one or more selected from a group consisting of copper iodide, copper(I) bromide, and copper(II) bromide. It is particularly preferable to use copper (II) bromide. By using the copper compound, a polyamide resin composition having excellent durability can be obtained.

The content of the component (E) is 0.001 to 0.1 parts by mass, and is preferably 0.01 to 0.05 parts by mass. When more than or equal to 0.1 parts by mass of the component (E) is added, metal corrosion and discoloration are more likely to occur.

Since the content of the component (E) is small, the component (E) is preferably blended by dissolving or dispersing the component (E) in a liquid component that is in the form of liquid at a room temperature, or is preferably blended in the form of a masterbatch. The liquid component is not particularly limited as long as it adheres to resin pellets to exhibit an effect of suppressing the same type of resin pellet in different types of resin pellets in a uniform mixed state from being gathered, i.e., exhibit an effect of suppressing segregation. Water is most conveniently used as the liquid component.

Further, the polyamide resin composition of the present invention is required to satisfy the following conditions: a melt mass flow rate of the polyamide resin composition with a moisture content of less than or equal to 0.05% (0.05 mass %) is more than or equal to 4.0 g/10 min and less than 13.0 g/10 min; and a cooling crystallization temperature (TC2) of the polyamide resin composition as measured by a differential scanning calorimeter (DSC) satisfies 180° C.≤(TC2) ≤185° C.

The melt mass flow rate (MFR) is a value measured at 275° C. under a load of 2160 g in accordance with JIS K 7210-1:2014. The measurement of the cooling crystallization temperature (TC2) is a peak temperature obtained using a differential scanning calorimeter (DSC) when the temperature is increased to 300° C. at a temperature increase rate of 20° C./min under a nitrogen gas flow, is held at that temperature for 5 minutes, and is then decreased to 100° C. at a rate of 10° C./min.

When the melt mass flow rate is less than 4.0 g/10 min, an excellent external appearance of the molded product cannot be obtained. In order to obtain a polyamide resin composition attaining a melt mass flow rate of more than or equal to 4.0 g/10 min, the following method is preferably employed: a crystalline polyamide resin having a very low viscosity (relative viscosity of 1.7 to 2.2) is used because the above-described range of the melt mass flow rate may not be reached (less than 4.0 g/10 min) when a commonly used crystalline polyamide resin having a relative viscosity of more than or equal to 2.3 is used; an agent for cutting the molecular chain of the polyamide resin is added during compounding; or the like. As the agent (also referred to as "viscosity reducing agent") for cutting the molecular chain of the polyamide resin, it is effective to use an aliphatic dicarboxylic acid, an aromatic dicarboxylic acid, or the like. Specific examples thereof include, but not particularly limited to, oxalic acid, malonic acid, succinic acid, adipic acid, azelaic acid, sebacic acid, phthalic acid, terephthalic acid, and the like. When the agent for cutting the molecular chain is added (contained), the amount of addition of the agent is about 0.1 to 3 parts by mass with respect to 100 parts by mass of the total of the components (A), (B), (C) and (D) in the present invention, with the result that the melt mass flow rate of the composition of the present invention becomes more than or equal to 4.0 g/10 min. However, the effect of the agent for cutting the molecular chain is changed depending on a compounding condition. Of course, as a compounding temperature is higher and a polymer retention time is longer during the compounding, the effect becomes more excellent. A general compounding temperature is in a range of 240 to 300° C. and a general polymer retention time during the compounding is in a range of 15 to 60 seconds.

When the melt viscosity of the resin is low, draw-down may occur or it may become difficult to perform measurement during injection molding. When the melt mass flow rate is more than or equal to 13.0 g/10 min, the range of the molding condition for the injection molding may be narrowed.

Further, when the cooling crystallization temperature (TC2) does not satisfy 180° C.≤(TC2)≤185° C., the molded product cannot attain a higher level of excellent external appearance due to the crystallization rate of the polyamide resin composition.

As required, the polyamide resin composition of the present invention may have a heat-resistant stabilizer, an antioxidant, an ultraviolet absorber, a light stabilizer, a plasticizer, a lubricant, a crystal nucleating agent, a mold releasing agent, an antistatic agent, a flame retardant, a pigment, a dye, a different type of polymer, or the like. In the polyamide resin composition of the present invention, the content of the total of the components (A), (B), (C), (D) and (E) is preferably more than or equal to 90 mass %, and is more preferably more than or equal to 95 mass %.

A method of producing the polyamide resin composition in the present invention is not particularly limited as long as the method is a melt-kneading extrusion method by which the blending amount of the components in the present invention is precisely controlled to fall within the above-described predetermined range; however, it is preferable to use a single-screw extruder or a twin-screw extruder.

When resin pellets to be blended are greatly different in shape, apparent specific gravity, friction coefficient and the like and are fed from a hopper portion of the extruder, the following method is preferably employed.

That is, the production method is such that (A) the crystalline polyamide resin including the polycapramide resin as the main component, (B) the semi-aromatic amorphous polyamide resin, (D) the carbon black masterbatch, and a dispersion of (E) the copper compound are mixed in advance and are introduced into the hopper portion of the extruder, and (C-1) the glass fiber, (C-2) the needle-shaped wollastonite, and (C-3) the plate-crystal inorganic reinforcing material are introduced as (C) the inorganic reinforcing material in accordance with a side feed method.

The liquid component containing the component (E) can suppress, with a very weak adhesion force, the components (A), (B), and (D) from being gradually separated and segregated from one another. Therefore, the effect of the present invention is more exhibited as a difference is larger between the pellets of the components in terms of shape, apparent specific gravity, friction coefficient, and the like.

EXAMPLES

Hereinafter, the present invention will be described in more detail with reference to examples, but the present invention is not limited to these examples at all.

The characteristics and physical properties in the following examples and comparative examples were measured in accordance with below-described test methods.

1) Melt mass flow rate (MFR): A resin composition pellet was dried by a hot-air dryer to a moisture content of less than or equal to 0.05%, and measurement was performed at 275° C. under a load of 2160 g in accordance with JIS K 7210-1:2014.

2) Cooling crystallization temperature (TC2): A DSC measurement device (EXSTAR6000 manufactured by Seiko Instruments) was used. TC2 was defined as a maximum point of an exothermic peak during decrease of temperature when the temperature was increased to 300° C. at a temperature increase rate of 20° C./min under a nitrogen gas flow, was maintained at that temperature for 5 minutes, and was then decreased to 100° C. at a rate of 10° C./min. A measurement sample for the DSC was cut out from a vicinity of the center of a flat plate of 100 mm×100 mm×3 mm for below-described evaluation.

3) Bending strength: Measurement was performed in accordance with JIS K 7171:2016.

4) Elastic modulus in bending: Measurement was performed in accordance with JIS K 7171:2016.

5) Degree of mirror surface luster: A molded product was produced using a mirror-finished mold having a size of 100 mm×100 mm×3 mm (thickness) at a resin temperature of 280° C. and a mold temperature of 80° C. A degree of luster at an incident angle of 60° was measured in accordance with JIS Z-8714 (a higher numerical value represents a more excellent degree of luster).

Results of measurement of the degree of luster were indicated in the following manner: O represents a degree of luster of more than or equal to 95; Δ represents a degree of luster of less than 95 and more than or equal to 90; and × represents a degree of luster of less than 90.

6) Color difference ΔE after weathering test: A weathering test (black panel temperature: 63±2° C.; relative humidity: 50±5%; irradiation method: rainfall (water jetting) for 18 minutes during 120 minutes; irradiation time: 1250 hours; degree of irradiation: 60 W/m²·S at a wavelength of 300 nm to 400 nm; optical filter: quartz (for an inner side) and borosilicate #275 (for an outer side)) was performed onto a textured flat plate (100 mm×100 mm×2 mm) in accordance with JIS K-7350-2 using a xenon weather meter (XL75 manufactured by Suga Test Instruments). The textured flat plate had been molded using an injection molding machine (IS80 manufactured by Toshiba Machine) at a cylinder temperature of 280° C. and a mold temperature of 90° C. Color difference ΔE was calculated by measuring L, a, and b values of the textured flat plate before and after the weathering test, using a spectrophotometer TC-1500SX manufactured by Tokyo Denshoku.

7) External appearance of the surface of the molded product after the weathering test (whether the reinforcing material was exposed or not): The textured flat plate before and after the weathering test in 6) above was visually checked in accordance with the following indexes: O represents that the reinforcing material is not recognized as being exposed; and × represents that the reinforcing material is recognized as being exposed.

8) State of the texture of the surface of the molded product after the weathering test: The textured flat plates before and after the weathering test in 6) above were visually checked in accordance with the following indexes: O represents that the pattern of the texture is apparently seen; and × represents that the pattern of the texture is not observed.

The raw materials used in the examples and comparative examples are as follows:

(A) The crystalline polyamide resin: nylon 6; M2000; manufactured by MEIDA; relative viscosity of 2.0

(B) The semi-aromatic amorphous polyamide resin: hexamethylene terephthalate/hexamethylene isophthalate (6T/6I resin); G21; manufactured by EMS; relative viscosity of 2.1

(C-1) The glass fiber: ECS03T-275H; manufactured by Nippon Electric Glass; fiber diameter of 10 μm; cut length of 3.0 mm (C-2) The needle-shaped wollastonite: NYGLOS-8; manufactured by NYCO; average fiber diameter of 8 μm; average fiber length of 136 μm (C-3) The plate-crystal inorganic reinforcing material: mica; S-325; manufactured by Repco; average particle size of 18 μm; average aspect ratio of 20

(D) The carbon black masterbatch: ABF-T-9801; manufactured by Resino Color Industry; AS resin as base resin; 45 mass % of carbon black is contained (E) The copper compound: copper(II) bromide Examples 1 to 3 and Comparative Examples 1 to 5

As the copper compound, copper(II) bromide was used in the form of an aqueous solution. The raw materials other than the inorganic reinforcing materials were mixed in advance so as to attain a composition shown in Table 1, and were then introduced from a hopper portion of a twin-screw extruder. The reinforcing materials were introduced from a side feeder of the twin-screw extruder. Compounding was performed at a cylinder temperature of 280° C. and a screw rotation speed of 180 rpm in the twin-screw extruder, thereby preparing pellets. Each of the obtained pellets were dried by a hot-air dryer until the moisture content thereof became less than or equal to 0.05%. Then, various characteristics thereof were evaluated. Evaluation results are shown in Table 1.

TABLE 1

| | | Unit | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|---|
| Composition | (A) Nylon 6 | Parts by Mass | 23 | 31 | 30 | 26 | 26 | 20 | 25 | 20 |
| | (B) 6T/6I Resin | Parts by Mass | 14 | 17 | 22 | 14 | 12 | 18 | 12 | 17 |
| | (C-1) Glass Fiber | Parts by Mass | 30 | 25 | 25 | 30 | 30 | 30 | 30 | 30 |
| | (C-2) Needle-Shaped Wollastonite | Parts by Mass | 15 | 12 | 10 | 15 | 16 | 16 | 15 | 15 |
| | (C-3) Mica | Parts by Mass | 15 | 12 | 10 | 15 | 16 | 16 | 15 | 15 |
| | (F) Copper(II) Bromide | Parts by Mass | 0.02 | 0.04 | 0.02 | 0.00 | 0.02 | 0.02 | 0.00 | 0.00 |
| | (D) Carbon | Parts by Mass (as MB) | 3 | 3 | 3 | 0 | 0 | 0 | 3 | 3 |

TABLE 1-continued

|  | Unit | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|
| Black Masterbatch | Parts by Mass (Only Carbon Black) | 1.35 | 1.35 | 1.35 | 0.00 | 0 | 0 | 1.35 | 1.35 |
| (B)/(A) | — | 0.61 | 0.55 | 0.73 | 0.54 | 0.46 | 0.90 | 0.48 | 0.85 |
| (A)+(B)+(D) | Parts by Mass | 40 | 51 | 55 | 40 | 38 | 38 | 40 | 40 |
| (C-1)+(C-2)+(C-3) | Parts by Mass | 60 | 49 | 45 | 60 | 62 | 62 | 60 | 60 |
| Evaluation Result — MFR | g/10min | 9.0 | 10.8 | 9.0 | 9.0 | 11.9 | 3.8 | 11.4 | 3.8 |
| Crystallization Temperature | °C. | 182 | 184 | 180 | 185 | 187 | 170 | 189 | 172 |
| Bending Strength | MPa | 250 | 292 | 243 | 250 | 240 | 255 | 240 | 255 |
| Elastic Modulus in Bending | GPa | 18.5 | 20.0 | 16.7 | 18.5 | 18.0 | 18.7 | 18.0 | 18.7 |
| Degree of Mirror Surface Luster | — | 98 (○) | 98 (○) | 99 (○) | 95 (○) | 90 (Δ) | 80 (x) | 90 (Δ) | 80 (x) |
| Color Difference ΔE After Weathering Test | — | 4.0 | 2.0 | 4.0 | 7.0 | 5.5 | 5.5 | 5.0 | 5.0 |
| Exposure of Reinforcing Material After Weathering Test | — | ○ | ○ | ○ | x | ○ | ○ | ○ | ○ |
| Texture State After Weathering Test | — | ○ | ○ | ○ | x | x | x | x | x |

From the results shown in Table 1, in each of Examples 1 to 3, it is understandable that: by controlling the crystallization temperature, a molded product having a very high degree of mirror surface luster and a higher level of external appearance was obtained; and by combining the predetermined amounts of the copper compound and the carbon black, the molded product is very excellent in terms of the color difference, exposure of the reinforcing material, and state of the texture after the weathering test, and is therefore excellent in durability and weather resistance of the external appearance of the surface of the molded product. On the other hand, in Comparative Example 1, the degree of mirror surface luster is at a satisfactory level, but the evaluation after the weathering test is poor. In each of Comparative Examples 2 to 5, the degree of mirror surface luster is insufficient and the state of the texture after the weathering test is particularly poor.

INDUSTRIAL APPLICABILITY

The polyamide resin composition of the present invention is excellent in balance between excellent external appearance and high rigidity, and can be suitably used for engineering plastics for vehicles, electric/electronic parts, and the like.

The invention claimed is:

1. A polyamide resin composition consisting essentially of: (A) a crystalline polyamide resin including a polycapramide resin as a main component; (B) a semi-aromatic amorphous polyamide resin; (C) an inorganic reinforcing material; (D) a carbon black masterbatch; and (E) a copper compound, wherein
as (C) the inorganic reinforcing material, the polyamide resin composition includes (C-1) a glass fiber, (C-2) a needle-shaped wollastonite, and (C-3) a plate-crystal inorganic reinforcing material,
(C-3) the plate-crystal inorganic reinforcing material is talc, mica, or non-calcined clay,
(D) the carbon black masterbatch comprises the carbon black and a base resin, and the base resin is a low-density polyethylene or an acrylonitrile-styrene copolymer,
the melt mass flow rate (MFR) of the polyamide resin composition after adjusting a moisture content to less than or equal to 0.05%, as measured at 275° C. under a load of 2160 g, is more than or equal to 4.0 g/10 min and less than 13.0 g/10 min,
the cooling crystallization temperature (TC2) of the polyamide resin composition as measured by a differential scanning calorimeter (DSC) is more than or equal to 180° C. and less than or equal to 185° C.,
a mass ratio of (A) and (B) satisfies $0.5 < (B)/(A) \leq 0.8$, and
when the total of (A), (B), (C) and (D) is assumed as 100 parts by mass, the content of (E) is 0.001 to 0.1 part by mass, and contents of the components satisfy the following formulas:

30 parts by mass$\leq(A)+(B)+(D)\leq$60 parts by mass, 13 parts by mass$\leq(B)\leq$23 parts by mass, 1 part by mass$\leq(D)\leq$5 parts by mass, 20 parts by mass$\leq(C\text{-}1)\leq$40 parts by mass, 8 parts by mass$\leq(C\text{-}2)\leq$25 parts by mass, 8 parts by mass$\leq(C\text{-}3)\leq$25 parts by mass, and 40 parts by mass$\leq(C\text{-}1)+(C\text{-}2)+(C\text{-}3)\leq$70 parts by mass.

2. A method of producing the polyamide resin composition recited in claim 1, wherein (A) the crystalline polyamide resin including the polycapramide resin as the main component, (B) the semi-aromatic amorphous polyamide resin, (D) the carbon black masterbatch, and a dispersion of (E) the copper compound are mixed in advance and are introduced into a hopper portion of an extruder, and (C) the inorganic reinforcing material is introduced in accordance with a side feed method.

* * * * *